N. PETERSON.
CHILD'S SADDLE.
APPLICATION FILED NOV. 7, 1916.
1,214,364.
Patented Jan. 30, 1917.
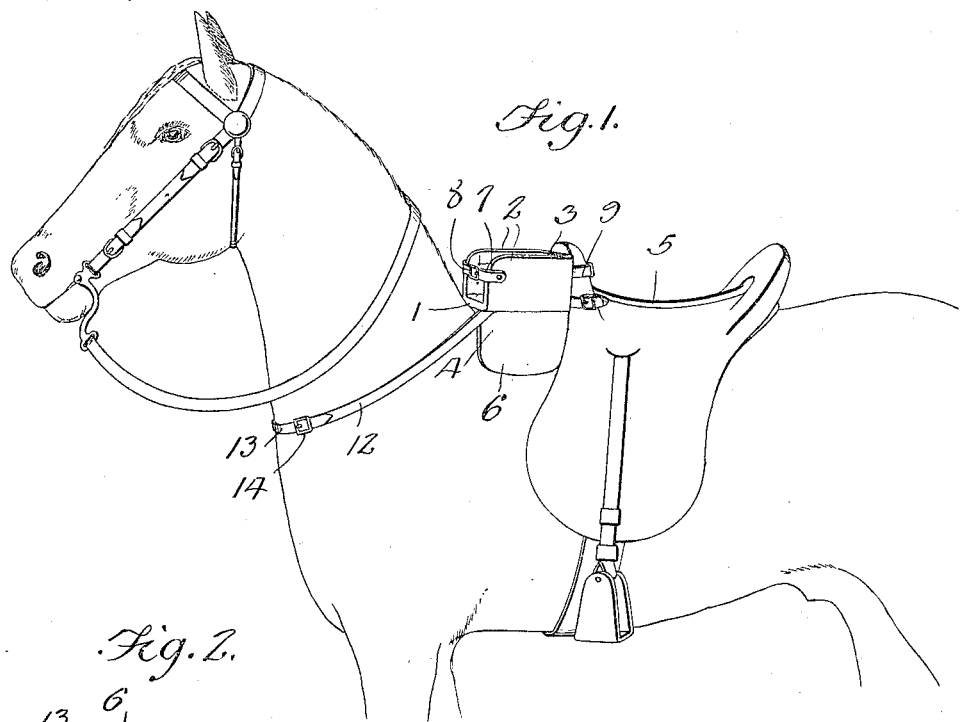
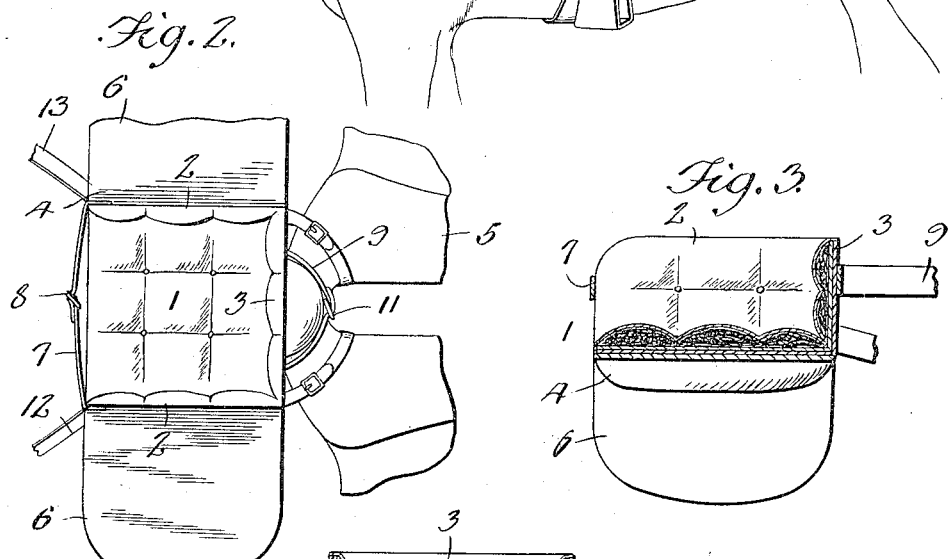
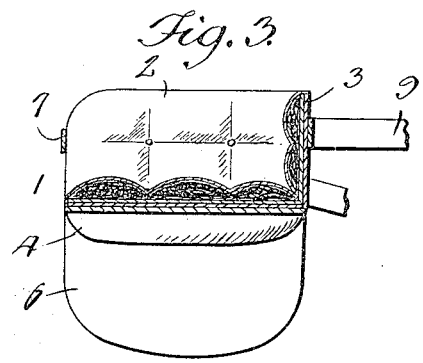
Inventor
N. Peterson,
By Victor J. Evans
Attorney
Witness

UNITED STATES PATENT OFFICE.

NELL PETERSON, OF WHITEWATER, COLORADO.

CHILD'S SADDLE.

1,214,364.

Specification of Letters Patent.

Patented Jan. 30, 1917.

Application filed November 7, 1916. Serial No. 130,011.

*To all whom it may concern:*

Be it known that I, NELL PETERSON, a citizen of the United States, residing at Whitewater, in the county of Mesa and State of Colorado, have invented new and useful Improvements in Children's Saddles, of which the following is a specification.

This invention relates to a child's saddle, the object of the invention being to provide a saddle adapted to be supported as an auxiliary saddle upon a riding animal in advance of a main saddle, whereby the child may be supported upon the animal in advance of the occupant of the main saddle, within convenient reach and observation of the occupant of the main saddle.

A further object of the invention is to provide a child's saddle which will easily and comfortably support the child, and which may be secured to the animal and main saddle in such a manner as to prevent displacement thereof, the said child's saddle being also provided with means for preventing the child from being unduly jolted or jarred or accidentally falling out.

The invention consists of the features of construction, combination and arrangement of parts hereinafter fully described and claimed, reference being had to the accompanying drawing in which:—

Figure 1 is a perspective view illustrating the mode of use of the child's saddle. Fig. 2 is a top plan view of the child's saddle and a portion of the main saddle. Figs. 3 and 4 are respectively, a vertical longitudinal and a vertical transverse section through the child's saddle.

In carrying my invention into practice, I provide a child's saddle comprising a seat portion 1, having upstanding side pieces 2 and an upstanding back piece 3 the side and back pieces forming a guard to hold the child in position upon the saddle and to provide a firm and secure back rest.

The seat portion 1 is secured to a saddle tree 4, designed to rest upon the back of the animal between a main saddle 5 and the base of the neck of the animal, and having depending skirts or flaps 6 to extend downwardly upon the sides of the animal, the construction and arrangement being such that the child occupying the side will be held in position immediately in advance of the rear saddle and sustained by the side and back pieces. The side pieces preferably extend fully to the front of the seat portion, leaving an open space at the front through which the legs of the child may project to extend downwardly at the sides of the neck of the animal.

In practice, the seat, sides, back and tree of the saddle are preferably composed of inner and outer layers of material with an interposed padding of a suitable kind, the outer layers of the seat, sides, back and tree being preferably composed of soft leather, and the inner layer of the tree of a suitable soft but durable material, such as sheep skin. The seat, sides and back are stiffened in any suitable manner to secure proper strength and durability, preferably by providing suitable stiffening members within the padding, and the upper surface of the seat and inner surfaces of the side pieces and back are preferably quilted or tufted as shown, in order to provide comfortable seat surfaces.

Attached to one of the side pieces is a strap 7 which is adapted to be passed across the front of the seat to hold the child from falling out and engaged with the buckle 8 on the other side, and attached to the back piece is a strap 9 adapted to be passed through or engaged with the horn or cantle of the main saddle 5 and with a buckle 11 on the back piece, whereby the child's saddle may be secured to the main saddle to hold it from shifting forwardly on the animal. Attached also to the flap 6 are straps 12 and 13, one of which is adapted to engage a buckle 14 on the other, which straps are adapted to be passed in the form of a loop around the neck and across the chest of the animal, thereby preventing the child's saddle from shifting rearwardly on the animal.

It will thus be seen that my invention provides a child's saddle whereby a small child may be seated upon the animal in advance of a main saddle occupied by a rider, in such a manner as to enable the child to ride with ease and comfort, and without danger of falling off the animal. It will also be seen that the child will be supported immediately in advance of the rider occupying the main saddle, so as to be constantly in view and in position to receive attention from the rider when occasion requires.

I claim:—

1. In combination, a child's saddle comprising a saddle tree adapted to rest upon the back of the animal in advance of a main saddle, means adapted to secure a child in position upon said child's saddle, means upon the child's saddle adapted to engage the main saddle for holding the child's saddle from forward displacement, and means upon the child's saddle adapted to engage the neck of the animal for holding the child's saddle against rearward displacement.

2. In combination, a child's saddle comprising a seat portion, a tree having depending flaps to which said seat portion is attached, and side and back pieces surrounding the corresponding portions of the seat and extending upwardly therefrom, means adapted to secure a child in said saddle, means upon the back piece of the child's saddle adapted to engage the cantle of a main saddle to hold said child's saddle from forward displacement, and means connected with the flaps of the tree and adapted to encircle the neck of the animal for holding the child's saddle against rearward displacement.

In testimony whereof I affix my signature.

NELL PETERSON.

Copies of this patent may be obtained for five cents each, by addressing the "Commissioner of Patents, Washington, D. C."